United States Patent Office

3,498,775
Patented Mar. 3, 1970

3,498,775
METHOD FOR PRODUCING A GLASS-CERAMIC ARTICLE
George A. Simmons, Toledo, Ohio, assignor to Owens-Illinois, Inc., a corporation of Ohio
No Drawing. Continuation-in-part of application Ser. No. 558,238, June 17, 1966. This application Oct. 4, 1967, Ser. No. 672,711
Int. Cl. C03b 31/00
U.S. Cl. 65—33                6 Claims

ABSTRACT OF THE DISCLOSURE

A glass-ceramic article is made from a glass composition, the glass-ceramic breaking or dicing like thermally tempered glass instead of producing fragments with sharp and pointed edges. One method of making such a glass-ceramic article is by heat treating a thermally crystallizable glass having the following composition:

| Ingredients: | Percent by weight |
|---|---|
| $SiO_2$ | 70.4 |
| $Al_2O_3$ | 15 |
| MgO | 4 |
| CaO | 3 |
| $Li_2O$ | 1.6 |
| $TiO_2$ | 2 |
| $ZrO_2$ | 1 |
| $Na_2O$ | 3 |
| F | 0.2 | to provide by bulk crystallization a glass-ceramic article, ion exchanging the surface of the article, heating the ion-exchanged glass-ceramic article to provide additional crystallization, and thermally tempering the resultant article.

---

This patent application is a continuation-in-part of my copending patent application Ser. No. 558,238, with common assignee, filed on June 17, 1966, and entitled "Glass-Ceramic and Process Therefor."

This invention relates to glass-ceramic articles that break in a manner characteristic of thermally tempered glass and to a process of making such glass-ceramic articles.

The article of the present invention is a glass-ceramic article having a main body of glass-ceramic and an integral compressive stress surface layer of glass-ceramic. The article has the property, when broken, of producing glass-ceramic fragments that do not have sharp or pointed edges. These fragments or particles are small cubes similar to the fragments or particles that are obtained when thermally tempered glass is broken. This type of fracturing is called by the term "dicing" which is used in the description on page 111 of the product of thermal tempering of E. B. Shand's book "Glass Engineering Handbook," 2nd edition, McGraw-Hill Book Co., Inc., New York, N.Y. An article having this property of dicing when shattered does not injure persons by cutting.

This article of the present invention has a flexural strength that is higher than a glass article of the same composition as the main body of the glass-ceramic article. The article of the invention can retain a substantial percentage of the flexural strength even after relatively severe abrasion and thus has this property similar to some ion-exchanged glasses. The product of this invention differs from ion-exchanged glass-ceramic articles, that have been produced by an ion-exchange treatment only of bulk-crystallized glass-ceramic articles. Such prior ion-exchanged glass-ceramics, upon breaking, fracture to produce fragments that have sharp or pointed edges.

The glass-ceramics of the main body and the surface layer both contain a glassy matrix and a crystalline phase that contains essentially $SiO_2$, $Al_2O_3$ and a metal oxide, preferably either $Li_2O$, $Na_2O$ or MgO, that forms a crystalline material with $SiO_2$ and $Al_2O_3$. The crystalline phase of the glass-ceramic of the surface layer has crystalline material containing $Li_2O$. When the glass-ceramic of the main body contains a crystalline material containing essentially $SiO_2$, $Al_2O_3$ and $Li_2O$, the glass-ceramic of at least the outer portion of the surface layer differs from the glass-ceramic of the main body. The crystalline species in this outer portion, at least of the surface layer, do not necessarily correspond to the type or amount of the crystalline species in the main body. For example, the glass-ceramic of the main body may contain a beta-spodumene or beta-spodumene-like crystalline phase, while the glass-ceramic of the outer portion of the surface layer may contain a mixture of such crystalline phase and beta-eucryptite or beta-eucryptite-like crystalline phase.

The glass-ceramic of the outer portion at least of the surface layer contains, perhaps as part of the crystalline phase, material that comprises $SiO_2$, $Al_2O_3$, and $Li_2O$ in addition to the crystalline phase containing $SiO_2$, $Al_2O_3$, and said metal oxide other than $Li_2O$, e.g., and preferably $Na_2O$ or MgO, when the crystalline phase of the main body of the glass-ceramic contains essentially $SiO_2$, $Al_2O_3$ and the same metal oxide other than $Li_2O$.

In any event, the overall composition of the glass-ceramic of the outer portion at least of the surface layer contains a higher molar percent of $Li_2O$ than that in the overall composition of the main body, and the overall composition of the former also contains a lower molar percent of at least one of the alkali metal oxides consisting of $Na_2O$ and $K_2O$ than that in the overall composition of the latter.

The glass-ceramic article of the invention has an average coefficient of linear thermal expansion of greater than $30 \times 10^{-7}/°$ C. and preferably at least $40 \times 10^{-7}/°$ C. over the temperature range 25° C. to 300° C.

The glass-ceramic of the main body and of the surface layer contain in addition to $SiO_2$, $Al_2O_3$, and said metal oxide, preferably $Li_2O$, $Na_2O$ or MgO, a nucleant such as $TiO_2$ and $ZrO_2$, minor amounts of compatible inorganic oxides, including metal oxides that serve as colorants, and minor amounts of impurities that have no adverse effects on the properties of the glass-ceramic.

The present process uses a thermally crystallizable glass that will form by a heat treatment a glass-ceramic having the minimum expansion coefficient mentioned above. These glasses contain as essential ingredients $SiO_2$, $Al_2O_3$, said metal oxide that in the process forms with $SiO_2$ and $Al_2O_3$ a crystalline material, preferably $Li_2O$, $Na_2O$ or MgO, a nucleant, and either (1) $Na_2O$ and/or $K_2O$ when said metal oxide is other than $Na_2O$ or (2) $K_2O$, but in some cases no $K_2O$, when $Na_2O$ is said metal oxide. Such ingredients, along with MgO or any other alkaline earth metal oxide that may be present as desirable ingredients, constitute at least 90%, preferably at least 95% by weight of the glass.

In the present process an article of such thermally crystallizable glass is heat treated to form a glass-ceramic having such minimum expansion coefficient or higher. A surface layer of this article is ion exchanged to replace sodium and/or potassium ions with lithium ions. At least the outer part of this surface layer, during the ion exchange or later, is further crystallized by heat treatment, either without any or with only a slight amount of further crystallization of the composition of the main body of the article. The present process then thermally tempers the ion-exchanged glass-ceramic article to obtain the article of the present invention with its above-described properties.

Prior bulk crystallized glass-ceramic articles lack the combination of the above-described properties of the articles of this invention. Also, none of the processes described in the prior art would produce this article of the invention merely by performing such processes. One reason is the use in certain prior processes of thermally crystallizable glasses that are not suitable for the process. Another reason, that is applicable to suitable thermally crystallizable glasses, is the use in the prior processes of one or more, but not all, of the steps of the present process. When such steps are used there is a failure to use conditions so as to correlate the results obtained by the individual steps as required to produce an article having the combination of properties obtained by the present process.

It is an object of the present invention to provide a glass-ceramic article having the property of high abraded flexural strength and yet having the property of producing fragments in breaking that do not have sharp or pointed edges or sharp corners.

It is another object of the present invention to provide a process for making the glass-ceramic article having the properties set forth in the foregoing object.

These and other objects of the present invention will be apparent to one of the ordinary skill in the art from the foregoing description of the article and the process of the invention when taken in conjunction with the detailed description that follows and that includes examples of carrying out the process of the invention.

The article of glass-ceramic of this invention is as described earlier with respect to the essential ingredients of the composition of the main body and its surface layer. In view of such compositional restrictions there are numerous examples of glass-ceramics obtainable from thermally crystallizable glasses that are not suitable, because the compositions of the thermally crystallizable glasses do not include any $Na_2O$ or $K_2O$, except perhaps for an unstated very small amount as a minor impurity in one or more of the batch materials used to make such glasses. Such compositions are illustrated by the examples of Tables III through XIV, except for the glass composition of Example 24, in Table IV of U.S. Patent No. 2,920,971.

The glasses of those tables of U.S. Patent No. 2,920,971 are illustrative of various types of thermally crystallizable glasses. Understandably they contain no $Na_2O$ and no $K_2O$, except for Example 24, because they are presented in the patent for the stated purpose of illustrating the crystallization of glasses to produce glass-ceramics having a low proportion of, or substantially no, glassy matrix. Such crystallization has for one stated purpose the increase of flexural strength by converting such glasses to glass-ceramics.

United States Patent No. 2,920,971 states that the thermally crystallizable glasses of such types appearing in those tables may contain a total amount of 10% by weight of $Na_2O$, $K_2O$ and other compatible metal oxides. Presumably, by remaining as part of a glassy matrix such metal oxides would reduce the amount of the increase in flexural strength produced by the crystallization. The patent indicates that the amount of $Na_2O$ and/or $K_2O$ is preferably not over 5% by weight. These modified thermally crystallizable glass compositions, that contain $Na_2O$ and/or $K_2O$, can be used in the process of the present invention to make the article of the invention, if they contain a sufficient amount of $Na_2O$ and/or $K_2O$. The concentration of $Na_2O$ and/or $K_2O$ should be at least the molar equivalent of 1% by weight of $Na_2O$ in the thermally crystallizable glass composition, i.e., that the total weight percent of $Na_2O$ actually present plus the molar equivalent of $Na_2O$ on a weight percent basis, that would represent the amount of $K_2O$ actually present as substituted by the equivalent on a molar basis of $Na_2O$, totals at least 1% by weight of $Na_2O$ of the composition.

Some other glass-ceramics are not suitable for another reason. These contain or may contain a suitable weight percent of either $Na_2O$ or $K_2O$ to provide ion-exchange so as to substitute sufficient lithium ions for either of these other alkali metal ions, but such glass-ceramics formed by in situ bulk crystallization, in view of the relative amounts of the essential ingredients and the amount of nucleant, provide glass-ceramics that have expansion coefficients below those specified above for use in the present invention. In such cases it is not feasible to provide by a limited time of crystallization at any temperature of glass-ceramic having a main body with the specified minimum expansion coefficient.

Some examples of such unsuitable glass-ceramics and thus unsuitable thermally crystallizable glasses from which they are made are different types of compositions that contain $SiO_2$, $Al_2O_3$ and $Li_2O$ along with a nucleant, $Na_2O$ and/or $K_2O$, and other compatible metal oxides. In such glass-ceramics the predominant crystalline phase is either beta-eucryptite, or beta-eucryptite-like crystals or beta-spodumene or beta-spodumene-like crystals, or both, as indicated by X-ray diffraction. Three types of such glass-ceramics appear in Table II of U.S. Patent No. 2,920,971 for one type, and copending U.S. patent applications Ser. Nos. 352,958, now Patent No. 3,380,818, and 464,147, filed on Mar. 18, 1964, by William E. Smith and filed on June 15, 1965, by Clarence L. Babcock et al., respectively, with common assignee, for the other two types.

The thermally crystalliazable glasses, that have the compositions of the foregoing three illustrative types of unsuitable glass-ceramics, have expansion coefficients greater than $30 \times 10^{-7}/°$ C. However, during bulk crystallization the article rapidly decreases its value for the expansion coefficient. This is partly because of the relatively high weight percent of $Li_2O$ in the composition being bulk crystallized and because of the fact that the crystals being formed have very low expansion coefficients.

The foregoing does not mean that there are not suitable glass-ceramics containing such predominant crystalline phase. Copending U.S. patent application Ser. No. 410,016 filed on Nov. 9, 1964, by Richard W. Petticrew, with common assignee, and entitled "Glass, Ceramic, and Method" describes a class of thermally crystallizable glass compositions and their use in the manufacture of glass-ceramics that are referred to as strong, partly crystalline ceramics. These compositions are such that the glass, when thermally crystallized, forms a glass-ceramic that has an expansion coefficient of at least $30 \times 10^{-7}/°$ C. This is the case partly because of the limited concentration of $Li_2O$ in the composition. A maximum of 2% by weight of $Li_2O$ is present.

Some thermally crystallizable compositions, that can be used in the process of the present invention to produce the article of the invention, are not preferred because the glass-ceramics obtained by bulk in situ crystallization have average linear expansion coefficients that are greater than $140 \times 10^{-7}/°$ C., over the range 25 to 300° C., which is the preferred upper limit for the average coefficient of linear thermal expansion of the glass ceramic of the main body of the article of the present invention. Thus this value is the preferred maximum expansion coefficient of the glass-ceramic obtained by the first step of the present process.

Some of the glass-ceramics reported in some of the tables of U.S. Patent No. 2,920,971 have expansion coefficients that are substantially greater than $140 \times 10^{-7}/°$ C. Glass-ceramic compositions modified by the desired presence of $Na_2O$ and/or $K_2O$ to utilize them in the process of the present invention would have lower expansion coefficients. Furthermore, such modified compositions as glasses can be bulk crystallized to a controlled lesser extent as a result of limiting the time and/or temperature of the heat treatment, so as to produce glass-ceramic in some cases having expansion coefficients less than such preferred maximum value.

The preferred upper limit on the expansion coefficient is to limit the differential between the expansion coefficient of the glass-ceramic obtained by the first step and the glass-ceramic surface layer's coefficient of expansion that may be attributable only partially to the presence of lithium introduced by the ion exchange because very low expansion crystalline material containing $SiO_2$, $Al_2O_3$ and $Li_2O$ may be formed by heat treatment during the ion exchange or thereafter.

In the process of the present invention, as described above, the first essential step is to heat treat the suitable thermally crystallizable glass at an elevated temperature and for a period of time to provide a glass-ceramic having at least the minimum expansion coefficient mentioned above. In the heat treatment there is the conventional raising of the temperature of the article of thermally crystallizable glass to a temperature at which nucleation occurs. Thereafter the article is raised in temperature to a desired maximum temperature at which the bulk crystallization occurs.

In view of the earlier remarks presented above, it is apparent that time and temperature to provide the desired degree of crystallization is not critical for certain compositions whereas in other cases the time must be reduced for a particular temperature so that it is substantially less than the minimum time required to obtain the normally desired highest or maximum degree of crystallinity. The percentage of time that this treatment is less than such normally desired minimum time varies. It is dependent upon the rate of crystallization for the temperature used. The final or maximum temperature is dependent upon the type of thermally crystallizable glass, the presence and concentration of inhibiting metal oxide and other inorganic oxides, the concentration of participating metal oxide, such as $Li_2O$, $Na_2O$ or $MgO$, relative to $Al_2O_3$ and somewhat relative to $SiO_2$ with which such participating metal oxide forms the crystalline phase. Also, the time is dependent somewhat upon the properties of the present invention that are required for the use of the article, because the combination of desirable properties, although present, will vary in the final product to some extent depending upon the crystallinity and type of first step, i.e., crystallization step, of the present process.

After the in situ bulk crystallization the article is treated with ion-exchange medium to substitute lithium ions of the ion-exchange medium for sodium and/or potassium ions in the surface layer only of the glass-ceramic article. The temperature of the ion-exchange treatment is an elevated temperature that is at least about 200° C. (392° F.), but is preferably above a temperature that equals the strain point of the thermally crystallizable glass from which the glass-ceramic is obtained. Especially preferred for the ion-exchange treating temperature is a minimum temperature that is at least as high as the temperature at which there is sufficient mobility of the glass-ceramic so that the introduction of the smaller ions, i.e., lithium ions for the ions of sodium and/or potassium, can be accomplished with contraction of the structure of the composition at these places of introduction in the surface layer to avoid the creation of tensile stress in the glass-ceramic surface layer. Temperatures below the especially preferred temperature for this ion-exchange can be used, but this would limit the depth of the ion-exchange so as to avoid spalling or any other damage at the surface layer due to the tension of this unrelieved tensile stress. When the ion-exchange is at these lower temperatures, the ion-exchanged article is heated thereafter to a sufficiently high temperature to relieve such tensile stress present that has not been of sufficient amount to creat spalling.

In any event, the ion-exchanged glass-ceramic article is heat treated to convert part of the composition of the ion-exchange surface layer to a crystalline material containing $SiO_2$, $Al_2O_3$ and $Li_2O$ that is either beta-eucryptite or beta-eucryptite-like crystalline phase or beta-spodumene or beta-spodumene-like crystalline phase, or both. The introduction of lithium ions for sodium and/or potassium ions results in a lowering of the expansion coefficient and the conversion of at least some of this lithium content to one or more of these crystalline phases. The latter results in a further, even more substantial reduction in the expansion coefficient of the ion-exchanged surface layer. The depth of the ion-exchange is preferably limited by the difference in the new expansion coefficient of the additionally crystallized surface layer vis-a-vis that of the main body when the expansion coefficient of the latter is quite high, such as substantially near $140 \times 10^{-7}/°$ C.

After or during the ion exchange at least the exchanged surface layer of the article is at a temperature of at least 1400° F. and up to about 2100° F. to provide crystallization in the ion-exchanged surface layer of crystalline material containing $Si_2O$, $Al_2O_3$ and $Li_2O$. This provides an additional crystallization in the surface layer, i.e., crystallization in addition to that provided in the initial bulk crystallization of the original article.

Subsequent to this additional crystallization in the surface layer, the article is thermally tempered. To provide this thermal tempering, the ion-exchanged glass-ceramic when being additionally surface crystallized can be at a sufficiently high temperature to rapidly cool a surface layer of the article. When the maximum thermal tempering is desired and the temperature of the article at the completion of the additional crystallization treatment after ion exchange is below that temperature, obviously the article is raised to the desired temperature from which its surface layer is rapidly cooled for the thermal tempering step of the present process.

As pointed out by M. E. Nordberg et al., in their article entitled "Strengthening by Ion Exchange" published in the Journal of the American Ceramic Society, volume 47 (May 1964) at page 215, glass has been strengthened by thermal tempering. In such thermal tempering of a glass article, the entire article of glass is first heated until its temperature is above the annealing point of the glass and below the softening point. Then the article is subjected to a chilling medium that is applied to the surface of the article so as to abstract thermal energy rapidly. The chilling medium cools the surface layer of the glass so that it becomes set or rigid and thus no longer has sufficient viscous flow to permit strain release. This chilling can be provided by the use of different types of chilling mediums, such as blasts of air or sprays of liquid or by use of an immersion of the hot glass article in oil or molten salt baths.

In the present thermal tempering of the ion-exchanged glass-ceramic one of such chilling mediums can be provided to rapidly cool the surface layer. In view of the fact that the article being thermally tempered is a glass-ceramic rather than a glass, the temperature of the entire article before such rapid cooling has a higher minimum temperature than in the glass of the glass article. Such minimum temperature preferably should be at least 1400° F. When using certain types of glass-ceramics obtained by the controlled crystallization of the present invention the glass-ceramic article, prior to rapid cooling of a surface layer, should be at a minimum temperature of at least 1800° F.

The maximum temperature of the article immediately preceding the rapid cooling is below that temperature at which substantial dissolution of the crystalline phase occurs in the glassy matrix of the glass-ceramic. Otherwise, the main body will be converted to glass or to a glass-ceramic having a very low degree of crystallinity and thus the main body would lose its desirable flexural strength that it has when the composition of the main body is present as a glass-ceramic rather than a glass or a glass with a very small amount of crystalline phase.

In the event that the type of composition used in the process of the present invention is such that the degree of crystallinity is controlled in the bulk crystallization step by limiting the time at the final maximum bulk crystallization temperature, and it is desired to rapidly cool the ion-exchanged glass-ceramic, after the additional crystallization in the surface layer, for chilling of a surface layer from such bulk crystallization temperature, the article is rapidly heated after the additional crystallization to such crystallization temperature and held at such temperature for as brief a time as possible so as to avoid any substantial additional bulk crystallization.

Of course, in the case of one type of glass-ceramic, such as used in Example 1 below, reasonable additional time at the crystallization temperature subsequent to the ion-exchange merely provides for the additional crystallization in the ion-exchanged surface layer and the main body remains substantially unchanged. Thus the time limit at such maximum temperature immediately prior to surface cooling for thermal tempering is not an important factor in carrying on this part of the process of the invention for such type of composition of the initial article.

The Smith U.S. patent application Ser. No. 352,958, mentioned above, describes the manner of heat treatment to convert its crystallizable glass composition to glass-ceramic. The maximum temperature reached in the heat treatment ranges from about 1400° F. to 2100° F. and the period of time at the final temperature used is dependent upon the degree of crystallization desired in the product and upon the actual maximum temperature. When the maximum temperature is limited to the range of about 1400° F. to about 1675° F., a main crystalline phase formed is beta-eucryptite or a beta-eucryptite-like phase. As the temperature is increased above about 1650° F. in the crystallization heat treatment one can obtain mixtures of beta-eucryptite-like crystals and beta-spodumene-like crystalline species. At the maximum heat treatment temperatures of about 1800° F. to 2100° F. one can obtain beta-spodumene or beta-spodumene - like crystalline phases, or both, as a main crystalline phase.

In view of such temperatures which are used for the additional crystallization of the ion-exchanged surface layer of the glass-ceramic article as described herein, the temperature used for the crystallization can be the temperature from which the surface layer is rapidly chilled, although the article can be heated rapidly to an even higher temperature following this additional crystallization from which the rapid chilling is initiated.

In the thermal tempering of the article following this additional crystallization the rapid chilling of the surface layer is followed by additional cooling of the entire article so as to maintain the chilled surface layer below the temperature at which it would relieve stresses and, of course, to cool the main body of the article with the maximum tensile stress occurring in the center part of the main body so that the stress pattern or the curve is analogous to that of a thermally tempered glass. The compressive stress created by the present process is a higher value adjacent to the surface of the article than would be the case for a thermally tempered glass article. This is the case because of the combination of ion-exchange and additional crystallization. The center tensile stress has basically the pattern in thermally tempered glass and the high stress at the center of the thickness of the article will cause, upon breakage of the article, a fracturing that is desired and that is described above as being that of thermally tempered glass. The thermal tempering creates some additional compressive stress in the surface layer which will have a greater depth of compressive stress than that caused by the ion-exchanged treatment and additional crystallization so that the thermal tempering can provide, in the article, additional flexural strength.

The combination of the treatment of ion-exchange with additional crystallization in the surface layer with the thermal tempering treatment that follows provides, also, the advantageous property of an ion-exchanged glass that is not a property of thermally tempered glass. This desirable property is that of retaining flexural strength to a substantial extent when the article is severely abraded.

United States Patent No. 2,779,136 ion-exchange glass articles to replace sodium ions with lithium ions and the ion-exchange surface layer at the temperature of the treatment in some compositions results in surface crystallization. However, the main body of the article is changed, if at all, to a substantially lesser degree. The glass compositions used may contain nucleants, but for these compositions, there can be no substantial bulk crystallization in view of the inadequate concentration of $Li_2O$. These compositions also have a concentration of $Na_2O$ which is present to form the glass and to permit the lithium substitution. This patent suggests additional increase of flexural strength by thermal tempering of the surface-crystallized glass article. The strength of such article after severely abrading it through the surface layer is only that due to the strength of the glass and that part of the strength remaining of that due to the compressive stress created by the thermal tempering. The article of the present invention upon being abraded through the ion-exchange surface layer has remaining the much higher flexural strength of glass-ceramic. Of course, it may not have the maximum of flexural strength obtainable by some glass-ceramics from the glasses used initially because the main body of the article of the present invention by choice of composition or by degree of bulk crystallization has been bulk crystallized along with the rest of the article of thermally crystallizable glass to permit the subsequent ion-exchange of the present process.

In the process of the present invention the article after the ion-exchange can be lowered to a temperature, such as room temperature, for removal of ion-exchange medium by rubbing or washing with water and then raised to the elevated temperature required for the additional crystallization in this ion-exchange surface layer.

One type of suitable thermally crystallizable glasses can use a maximum final temperature in the heat treatment that is sufficiently low to contact the article with a suitable ion-exchange medium during this last part of this maximum final temperature treatment of the bulk crystallization of the glass article. In other cases, the thermally crystallizable glasses that are used in the process require a final step of heat treatment that is at the temperature substantially above that desired to avoid degradation of the ion-exchange medium so that the ion-exchange treatment is performed after the completion of the bulk crystallization and after lowering the temperature of the glass-ceramic article to a lower temperature at which such degradation does not occur to an appreciable extent, if at all. For example, an ion-exchange medium that is a mixture of lithium and sodium sulfates can be used as a molten salt bath to ion-exchange lithium for sodium in the glass-ceramic. The temperature of the bath can be as high as 900° C. (1652° F.) which for a certain type of thermally crystallizable glass, as seen later, is the final temperature used in the bulk in situ crystallization of such glass. At that temperature ion-exchange treatment may be for only a few minutes and such could be performed at the very end of the bulk crystallization.

Another thermally crystallizable glass that is suitable requires a substantially higher temperature for the final step of the heat treatment to provide the bulk crystallization. One example is a temperature of 1100° C. (2012° F.). At such temperature there is degradation of such ion-exchange medium at an undesirable rate. This dictates the completion of the bulk crystallization to the desired extent according to this invention followed by lowering the temperature of the glass-ceramic article before the ion-exchange treatment.

Of course, when the ion-exchange treatment of any of these glass-ceramics is to be performed at much lower temperatures than the final temperature used for the crystallization, obviously the crystallization is completed and the temperature of the article is lowered to the desired temperature for the ion-exchange treatment.

In the part of the process of the invention which is thermal tempering, a tensile stress is created in the main body and a compressive stress is created within the outer portion or layer of the article.

In view of the fact that lithium ions replace sodium or potassium ions in an outer part of the glass-ceramic article during the ion-exchange treatment and such replacement results in the formation of crystals of lithium-containing crystalline material that have low coefficients of thermal expansion, namely, beta-eucryptite or a beta-eucryptite-like crystalline phase, or beta-spodumene or a beta-spodumene-like crystalline phase, or a mixture of these, this outer portion is a glass-ceramic having a very substantially lower coefficient of expansion than that of the main body of glass-ceramic of the article. This difference in expansion creates a compressive stress in the outer portion where the ion-exchange has occurred and produces a tensile stress in the main body.

The foregoing description of the process and the article of the invention has presented the differences over the prior art. The particular combination of the steps of the present process includes their sequence, the choice of compositions of thermally crystallizable glass, their limited bulk crystallization by virtue of such choice and/or time and maximum temperature of final bulk crystallization, type of ion exchange, additional crystallization in a surface layer and subsequent thermal tempering. From this description one of ordinary skill in the art can determine by simple experimentation with such thermally crystallizable glasses the particular conditions for the best mode of performing the present process. The following is a description of a few examples, the first example being a preferred embodiment, that are contemplated for the carrying out of the process of the present invention.

EXAMPLE I

Three glass-ceramics in the form of rods from canes of the same thermally crystallizable glass but subjected to different heat treatments for bulk crystallization were made as follows:

A mixture of the following batch materials was melted in a platinum crucible within a gas-fired furnace using slightly oxidizing conditions. The maximum temperature was about 2900° F. The overall time of melting the glass and fining it was about 70 hours. After the batch materials had melted and reacted to form the glass, the latter was mechanically stirred until fining of the glass was obtained.

| Batch materials: | Parts by wt. |
|---|---|
| Petalite [1] | 1716 |
| Ottawa flint [2] | 2166 |
| Alcoa A-10 alumina [3] | 474 |
| Periclase [4] | 98 |
| Florida zircon [5] | 75 |
| Titanox [6] | 100 |
| Sodium carbonate | 256 |
| Raw dolomite [7] | 492 |
| Lithium fluoride [8] | 14 |

[1] 4.2% $Li_2O$, 16.2% $Al_2O_3$, 77.7% $SiO_2$, 0.4% $Na_2O$, 0.2% $K_2O$ and 0.027% $Fe_2O_3$, and other minor impurities, including 1% ignition loss.
[2] 99.9+% $SiO_2$.
[3] 99.5% $Al_2O_3$, 0.03% $Fe_2O_3$, 0.1% $Na_2O$, 0.08% $SiO_2$, 0.2% ignition loss at 900° C.
[4] 95.3% $MgO$, 0.15% $Fe_2O^3$, 2.8% $SiO_2$, 0.3% $Al_2O_3$, 1.1% $CaO$.
[5] 66% $ZrO_2$, 33.5% $SiO_2$, 0.25% $TiO_2$, 0.1% $Fe_2O_3$.
[6] Substantially pure $TiO_2$.
[7] 21.34% $MgO$, 30.48% $CaO$, 0.3% $SiO_2$, 0.1% $Al_2O_3$ and 0.06% $Fe_2O_3$.
[8] Substantially pure LiF, except about 1% ignition loss.

The glass was cooled to a suitable temperature at which it has the desired viscosity to draw or pull a number of canes. The glass of these canes had the following theoretical composition on a weight basis, based on chemical analyses of the batch materials, assuming no loss of ingredients, and ignoring minor impurities.

| Ingredient: | Percent |
|---|---|
| $SiO_2$ | 70.4 |
| $Al_2O_3$ | 15 |
| $MgO$ | 4 |
| $CaO$ | 3 |
| $Li_2O$ | 1.6 |
| $TiO_2$ | 2 |
| $ZrO_2$ | 1 |
| $Na_2O$ | 3 |
| F | 0.2 |

The glass had a liquidus temperature of 2250° F., a log 4 viscosity of 2390° F., i.e., a viscosity of $10^4$ poises at that temperature, and an annealing point of 1225° F. The average coefficient of linear thermal expansion of this glass was between $40 \times 10^{-7}$ and $50 \times 10^{-7}/°$ C. for the temperature range of 25° C. to 300° C.

The drawn cane of this glass was cooled slowly to room temperature. After their annealing the sample canes, having an average diameter of $0.200 \pm 0.005$ inch, were cut into 5-inch lengths to make sample rods.

Three groups of these glass rods were subjected to different heat treatments in an electric furnace for an in situ bulk crystallization. In the case of the first group the heat treatment was as follows: 1300° F. for 2 hours, 1500° F. for 2 hours and 1750° F. for 1 hour. The other two groups of sample rods were heat treated for the same periods of time at 1300° F. and 1500° F. One of these other groups was then treated further at 1650° F. for 1 hour. The third group was treated after the heat treatment at 1500° F. at 1550° F. for 1 hour. In all cases the rods were slowly cooled to room temperature by shutting off the electric power used to heat the furnaces for the heat treatment of the rods that had been in the furnace for one of these three types of heat treatment.

As described in the example in my copending U.S. patent application Ser. No. 626,940, filed on Mar. 30, 1967, and entitled "Glass Treatment and Glass-Ceramic Article Therefrom," such three groups of crystallized, i.e., glass-ceramic, rods were subjected to an ion-exchange by immersion in a molten bath of potassium nitrate for 3 hours at 400° C. The rods were removed from the molten bath and to avoid thermal tempering were cooled freely in air at room temperature. The cooled rods after washing with water to remove an adherent coating of potassium nitrate were dried. The rods were severely abraded by tumbling for 15 minutes in a ball mill containing No. 30 silicon carbide grit. These abraded rods were tested for their flexural strength. A number of rods, that were similarly treated, were tested to provide an average value of abraded flexural strength.

In the case of ion-exchange treatment of glass to improve its strength, it has been determined that such severe abrasion using this No. 30 silicon carbide grit will substantially reduce or eliminate the increase of flexural strength afforded by ion exchange unless the abrasive stress surface layer created by the ion-exchange treatment has a depth of at least 50 microns.

The ion-exchanged glass-ceramic rods from the heat treatment having the maximum temperature of 1750° F. had an average abraded flexural strength of only 19,500 p.s.i. Those sets of rods that had been heat treated with the maximum temperatures of 1550° F. and 1650° F. had average abraded flexural strengths of 75,800 p.s.i. and of 47,200 p.s.i.

The invention of my last-mentioned copending patent application is illustrated by the comparison of those flexural strengths. The data show the importance of limiting the maximum temperature of the heat treatment to about 1650° F. for the crystallilation so as to obtain high abraded flexural strength by such ion exchange of such glass-ceramic composition in which the substitution in the glass-ceramic is by larger alkali metal ions, specifically potassium ions, in the ion-exchange medium as an inorganic salt. In the present invention lithium ions replace larger alkali metal ions, specifically potassium ions, in the ion-exchange medium as an inorganic salt. In the present invention lithium ions replace larger alkali metal ions, in the glass-ceramic and such maximum temperature of about 1650° F. of that other process is not a limitation in the process of the present invention, although it is preferred for such composition and others of the same type that are described later in greater detail.

Accordingly, in this example rods of the three heat treated groups of sample rods are immersed in a molten eutectic mixture of alkali metal salts, namely, 63% by weight of lithium sulfate, 23% by weight of sodium sulfate and 14% by weight of potassium sulfate. This salt bath is maintained at 1050° F. The sample rods, after an immersion for about 30 minutes, are removed from the bath of the molten salt mixture, cooled to room temperature, washed with water to remove the adherent coating of salt, and dried.

The dried rods are placed in an electric furnace which is raised to 1600° F. The furnace is maintained at this temperature. After a period of about 2 hours at 1600° F. the rods are removed and immediately subjected to blasts of air at room temperature so as to rapidly cool a surface layer of the rods to a temperature at which the glass-ceramic of this surface layer is incapable of relieving stresses. Such cooling by air blasts is for a period of time of about 30 seconds. The rods are allowed to cools in ambient air so as to gradually lower the temperature of the main body of the rods to room temperature. During the cooling the glass-ceramic of the main body is also cooled below the minimum temperature at which it is capable of relieving stresses. As the main body cools from 1600° F., stresses are created because of the difference in the expansion coefficients of the ion-exchanged, additionally crystallized surface layer that has been cooled rapidly by the air blasts and of the main body of glass-ceramic. This main body may be substantially unchanged by this heating at 1600° F. for two hours. However, there may be some increase in crystallinity for that group of rods that had been previously heated to a maximum of 1550° F. in the crystallization process.

The stresses created are a tensile stress in the main body of the rods and a compressive stress in the rapidly cooled surface layer. This stress pattern probably is somewhat similar to that obtained conventionally by thermal tempering glass sheets of one-quarter inch nominal thickness. A high maximum value of tensile stress is obtained at the center because the stress created by the thermal tempering is supplemental to the stress pattern also being created, as the main body cools, by virtue of the difference in expansion coefficients of the surface layer resulting from the ion exchange and the subsequent additional crystallization. The ion-exchange lowers the expansion coefficient of the glassy matrix in the surface layer and the subsequent crystallization to form additional crystalline material of low expansion coefficient further lowers it.

In view of this stress pattern of the rods and the degree of tensile stress at the center of the main body of rods, upon breakage the rods will shatter with the dicing effect of thermally tempered glass. In view of the amount of compressive stress in a surface layer of the rods after the combination of steps described above, such rods have a substantial flexural strength. Part of the stress is attributable to the flexural strength of the original glass-ceramic as compared with the initial thermally crystallizable glass. Another part of the stress is due to the difference in coefficient of expansion between the main body and the surface layer containing this compressive stress.

A further part of the stress is due to the thermal tempering.

The abraded flexural strength of such rods is also high. The abrasion, to effectively lower substantially the flexural strength, must remove compressive stress formed in the surface layer as a result of the lowering of the expansion coefficient by the additional crystallization during the heat treatment subsequent to the introduction of additional lithium ions by the ion exchange. Glass-ceramic is harder and thus more resistant to abrasion than thermally crystallizable glass of the same overall composition as disclosed by P. W. McMillan on pages 154–5 in his book entitled "Glass-Ceramics," published by Academic Press, New York, N.Y., in 1964. Thus the additional crystallinity provides greater scratch resistance and thus provides a higher retention of flexural strength.

In the case of the rods that initially in situ bulk crystallized with the maximum temperature being 1550° F. and 1650° F. there is obtained a compressive stress described by Petticrew as probably due to a higher degree of crystallinity in a surface layer than in the main body as a result of the bulk crystallization of such type of thermally crystallizable glass. However, in the present invention this initial compressive stress is of less importance than in the Petticrew invention because of the compressive stress obtained later by the ion exchange in combination with the subsequent crystallization and by the later thermal tempering. In this example the rods obtained still have the main body as glass-ceramic with expansion coefficients that are above the minimum stated above. Thus the rods, in view of all of their properties mentioned above, have the composition and the structure of the articles of the present invention. The surface layer has a higher $Li_2O$ content than the main body and has a lower content of $Na_2O$ than in the main body.

United States patent application Ser. No. 572,226, filed on Aug. 15, 1966, by Richard D. Duff and entitled "Process of Treating Glass Articles," wtih common assignee, describes the ion-exchange treatment for substituting lithium ions for sodium ions in a glass containing on a weight basis 63.5% $SiO_2$, 9.5% $Al_2O_3$, 8.6% CaO, 0.1% MgO, 15.9% $Na_2O$ and 2.4% $K_2O$. The treatment was by an immersion of this glass in a molten eutectic mixture of lithium sulfate, sodium sulfate and potassium sulfate having the same weight percentages as described above for Example I. Using a 1-hour treatment at 1050° F. the ion exchange resulted in a compressive stress surface layer having a depth of 150 microns. The Duff patent application also states that this glass, after such lithium substitution for sodium, can be ion exchanged with sodium nitrate at 750° F. (400° C.) for 4 hours to provide a compressive stress surface layer depth of 140 microns. Thus it is seen that the rate of ion exchange to substitute lithium for sodium is about 4 times as fast as that of the substituting sodium for lithium.

United States patent application Ser. No. 362,481, filed by Robert R. Denman on Apr. 24, 1964, now Patent No. 3,428,513 and entitled "Ceramic, and Method," with common assignee, shows the substitution of sodium for lithium in a glass-ceramic of the type disclosed and claimed in the Smith application Ser. No. 352,958 mentioned above using sodium nitrate at 750° F. for 3 hours. There was obtained a compressive stress surface layer having a depth of 72 microns. Its unabraded and abraded moduli of rupture were 96,000 p.s.i. and 78,500 p.s.i., respectively.

A comparison of the depth of compressive stress surface layer with that of ion-exchanged glass as described by Duff indicates that the diffusion rate in glass-ceramic is less than that of glass of the same composition. The difference is dependent somewhat upon the crystallization process conditions. The substitution of lithium for the larger alkali metal ions of the sample rods of the type of this Example I results in a compressive stress surface layer of presumed substantial depth by virtue of the 30-minute treatment at 1050° F.

It has been found by others that exchange between alkali metal ions in a glass and of an alkali metal salt is a diffusion-controlled reaction as pointed out by the article by M. E. Nordberg et al., mentioned above. This rate of reaction is shown in FIG. 7 of that article by Nordberg et al. who indicate that the rate follows Fick's diffusion law. They conclude that it is necessary to treat a glass four times longer to double the amount of reaction. They also point out that the rate of sodium for lithium exchange is much faster than the rate of potassium for sodium exchange.

The foregoing Example I illustrates the invention using a thermally crystallizable glass that is a member of a class of glasses that contain $SiO_2$, $Al_2O_3$, $Li_2O$, alkaline earth metal oxide selected from the group consisting of MgO and CaO, alkali metal oxide selected from the group consisting of $Na_2O$ and $K_2O$, and a nucleant selected from the group consisting of $TiO_2$ and $ZrO_2$, with said $SiO_2$, $Al_2O_3$, said alkaline earth metal oxide and said nucleant constituting at least 90% by weight of the glass-ceramic overall composition, and said $Li_2O$ constituting a maximum of 2% by weight of the glass. The alkali metal oxide preferably constitutes 2.5% to 6% by weight of $Na_2O$ or $K_2O$ or both, but such alkali metal oxide on a broad basis can be as low as 1% by weight of $Na_2O$ or of the molar equivalent, expressed as $Na_2O$, of $K_2O$ or of the sum of the molar equivalent, expressed as $Na_2O$, of $K_2O$ and actual $Na_2O$ present. Such thermally crystallizable glass preferably also contains on a weight basis 60% to 74% $SiO_2$, 13% to 17% $Al_2O_3$, 1.5% to 2% $Li_2O$, 6% to 13% said alkaline earth metal oxide and 2% to 8% said nucleant, while $TiO_2$ is present in the glass in a maximum of 7% by weight and $ZrO_2$ is present in the glass in a maximum of 2% by weight.

In the especially preferred glasses of this class, the compositions contain on a weight basis, in addition to $SiO_2$, $Al_2O_3$ and $Li_2O$ within the preferred ranges mentioned above, 2% to 7% MgO, 2% to 7% CaO, 1% to 7% $TiO_2$, 0 to 2% $ZrO_2$, 0 to 6% $Na_2O$ and 0 to 4% $K_2O$, while the sum of $Li_2O$ and $TiO_2$ is 3% to 9%, the sum of $TiO_2$ and $ZrO_2$ is 2% to 8%, the sum of CaO+MgO is 6% to 13%, the sum of $Na_2O$ and $K_2O$ is 2.5% to 6%, said glass consisting of at least 90 weight percent $SiO_2+Al_2O_3+MgO+CaO+Li_2O+TiO_2+ZrO_2$. These especially preferred glasses for use in the present invention are the claimed thermally crystallizable glasses used in the claimed process to make the claimed glass-ceramics in the Petticrew application Ser. No. 410,016.

Most of the thermally crystallizable glasses within the scope of either such glasses of the invention of the Smith patent application Ser. No. 352,958 or such glasses of the Babcock et al. patent application Ser. No. 464,147 are not suitable for use in the present process, because their bulk crystallization rapidly, i.e., early during crystallization, provide glass-ceramics having expansion coefficients that are below $20 \times 10^{-7}/°$ C. These glass-ceramics are usually much lower than such expansion coefficient value. The same is true for other types of compositions, which also contain the same three essential ingredients but in different proportions, e.g., most of those disclosed in Table II of U.S. Patent No. 2,920,971.

The relationship between crystallinity between the finishing temperature, that has previously been referred to as the maximum or final temperature, and the time of treatment at such temperature is illustrated by U.S. Patent No. 3,252,778 for a specific glass and glass-ceramics obtained from it. In other words, although the crystallinity can be controlled by adjustment of composition, it also can be controlled by varying the crystallization time.

EXAMPLE II

This example illustrates the process of the present invention using a thermally crystallizable glass that contains $Na_2O$ (or $Na_2O$ plus $K_2O$) as the metal oxide that forms a crystalline phase with $SiO_2$ and $Al_2O_3$. This crystalline phase is commonly referred to as a nepheline type of crystalline phase. When such thermally crystallizable glasses of the class used in this example form nepheline-type glass-ceramics, using a final or finishing temperature for a short period, namely, 1 hour, provides a highly crystalline article. This class of thermally crystallizable glasses and the glass-ceramics from it, along with the method of making the latter, are claimed in copending U.S. patent application Ser. No. 371,089, filed by William E. Smith on May 28, 1964, and entitled "Glass, Ceramics and Method," with common assignee.

That Smith patent application states that such glasses generally have crystallization temperatures in the temperature range of 1700° F. (about 927° C.) to 1950° F. (about 1065° C.). The time at such finishing temperature is indicated generally to be between 15 minutes to 6 hours, usually ½ to 4 hours. Thus at the lowest temperature of the range substantially more time than 1 hour is usually required to complete the crystallization. By using much less than this maximum time the glass-ceramic obtained can have a sufficiently low degree of crystallinity to leave sufficient $Na_2O$ in the glassy matrix for an ion exchange to replace sodium ions with lithium ions.

In the present example, instead of bulk crystallization to a limited extent to permit ion exchange in a surface layer the usual crystallinity is obtained during conversion to the glass-ceramic. A surface layer of this glass-ceramic is converted to the thermally crystallizable glass while retaining the main body as glass ceramic. This layer of glass is ion exchanged, e.g., at 1050° F. This is possible, because the glass-ceramic has an expansion coefficient that considerably exceeds the minimum expansion coefficient required for the main body during a subsequent thermal tempering step of the process of this invention, i.e., such a highly crystalline glass-ceramic obtained in the first step can be used because of its high expansion coefficient.

A mixture of flint sand, high purity alumina, high purity rutile and C.P.-grade sodium carbonate was melted to a glass in a platinum crucible in a gas-fired furnace using slightly oxidizing conditions. Melting time was 22 hours at 2800° F., with mechanical stirring. A number of canes were pulled from the melt. The cane was cooled slowly to room temperature and then cut into sample rods having the average diameter and length as described in Example I. Some of these rods were given the following heat treatment schedule.

| Hours: | ° F. |
|---|---|
| 2 | 1350 |
| 1 | 1450 |
| 1 | 1500 |
| 1 | 1800 |

The rods were slowly cooled in the furnace by simply shutting off the power.

The analyzed composition of the glass on a weight basis was: 48.1% $SiO_2$, 26.4% $Al_2O_3$, 17.5% $Na_2O$ and 8% $TiO_2$. This glass has a liquidus temperature of 2215° F., a log 4 viscosity of 2210° F., and an annealing point of about 1200° F. It has an average coefficient of linear thermal expansion (0° C. to 300° C.) of $90 \times 10^{-7}/°$ C. The average linear coefficient of expansion (0° C. to 300° C.) of the glass-ceramic was about $100 \times 10^{-7}/°$ C. to $120 \times 10^{-7}/°$ C.

Sample rods of the glass-ceramic were found to have a modulus of rupture, after abrasion as described above, of 20,000 p.s.i., whereas unabraded rods had a modulus of rupture of more than 30,000 p.s.i. Sample rods of the thermally crystallizable glass, without abrasion, would be expected in view of other data to have an average modulus of rupture of about 10,000 p.s.i. and a lower value for such rods after such abrasion.

Sample rods of this thermally crystallizable glass and sample rods of the glass-ceramic were immersed in molten potassium nitrate for various periods of time. The rods were then removed from the molten salt and cooled slowly to room temperature to avoid the creation of thermal stress. Next the samples were washed with water to remove the potassium nitrate coating. Some rods of different times of treatment were examined by well-known techniques to determine the depth and type and amount of stress for the surface layers. Other sample rods were tested for modulus of rupture, after their abrasion with silicon carbide grit.

The rods of the glass-ceramic were immersed in molten potassium nitrate maintained at 340° C. and 400° C. for 5 hours and 64 hours, respectively. Neither of these potassium nitrate immersion treatments produced any stress in the rods and thus, of course, there was no stress layer. The moduli of rupture of the subsequently-abraded rods were 13,000 p.s.i. and 14,000 p.s.i., respectively. These data show that the glass-ceramic of this type is not ion exchanged under such conditions to replace sodium with potassium in a glass-ceramic surface layer of the glass-ceramic article.

The sample rods of the thermally crystallizable glass were immersed in a bath of molten potassium nitrate maintained at 400° C. for different periods of time, namely, 4, 8, 16, 24, 32 and 64 hours. For all six time periods of ion-exchange treatment the rods were found to have a compressive stress surface layer. The depth of this layer after 4, 8, 24 and 64 hours of treatment was 36+, 45, 63 and 100 microns, respectively. For sample rods after 4, 8, 24 and 64 hours of immersion, followed by the abrasion described above, had modulus of rupture of 22,000 p.s.i., 63,000 p.s.i., 125,000 p.s.i. and 114,000 p.s.i., respectively. The lower flexural strength after 64 hours of treatment as compared with 24 hours of treatment is not unexpected. It is well known in the art of ion exchange of glasses that the process can be conducted for too long a period of time and this will start a decrease of compressive stress on the surface layer.

Sample rods of glass-ceramic can be removed from the furnace when the furnace is shut down and the rods are fire polished by directing on their surface the flame of a Meeker burner for a short period of time to convert a surface layer of the glass-ceramic to the thermally crystallizable glass and then returned to the furnace for cooling. This surface layer can be about 200 microns in thickness. This was simulated by preheating rods of the glass-ceramic to an elevated temperature followed by the flame treatment and then slowly cooling the rods. The flame-treated rods had a glass surface layer with a compressive stress.

The foregoing is a partial description of an example that is presented in copending U.S. patent application Ser. No. 532,058, filed by William E. Smith on Mar. 7, 1966, and entitled "Process and Product," with common assignee.

In the present example such sample rods of glass-ceramics are fire polished as described above when the furnace is shut down. To do this the rods are removed from the furnace and immediately subjected to the flame as described above and then returned to the cooling furnace.

When the temperature of the cooling furnace reaches about 1600° F., the rods are immersed in a molten bath of lithium-containing salt mixture as described in Example I, illustratively for about 15 minutes, during which sodium ions in at least the outer portion of the glass layer are replaced by lithium ions. The rods are removed from the bath and are retained at this temperature by being put in an electric furnace at that temperature for an approximate time, illustratively for about 30 minutes. Then the rods are removed from the furnace and subjected to blasts of air at room temperature as described in Example I to chill the layer of ion-exchange glass now partially crystallized and thereafter the main body is cooled to complete the thermal tempering.

In this example, the rods of thermally crystallizable glass are converted to glass-ceramic of a high degree of crystallinity but the surface layer, by conversion to glass, is ion exchanged and then crystallized to provide a crystalline phase that has a much lower expansion coefficient than the main body. Thus the subsequent thermal tempering and this difference in expansion coefficients cooperatively result in the article of the present invention. The overall treatment does not significantly change the expansion coefficient of the glass-ceramic of the main body from its original value obtained by the initial bulk crystallization.

This example utilizes a thermally crystallizable glass containing $SiO_2$, $Al_2O_3$, $Na_2O$ and $TiO_2$ as the sole essential constituents and optionally containing $K_2O$ as a fifth constituent, said constituents being present in the glass in the following weight percent ranges: 44–52% $SiO_2$, 22–29% $Al_2O_3$, 15–22% $Na_2O$, 6–12% $TiO_2$, 0–3% $K_2O$, 69–76% ($SiO_2+Al_2O_3$) and 17–22% ($Na_2O+K_2O$) the weight ratio of $SiO_2$ to ($Na_2O+K_2O$) being from 2.1:1 to 3:1 and the molar ratio of ($Na_2O+K_2O$) to $Al_2O_3$ being at least 1.02:1. Such glass is claimed in the Smith application Ser. No. 371,089.

EXAMPLE III

Sample glass rods are obtained from cane drawn from molten glass made as described in U.S. patent application No. 365,203, now abandoned, on which Dutch Patent 6,505,743 is based in part. This glass has, on the basis of raw materials, a theoretical composition by weight on an oxide basis as follows: 49.4% $SiO_2$, 16.9% $Na_2O$, 25.9% $Al_2O_3$, 2.2% MgO, 5.1% $TiO_2$ and 0.6% $As_2O_3$.

This group of sample rods are heated at 300° C./hour to 850° C., held at 850° C. for 4 hours, heated at 300° C./hour to 1020° C., and held at 1020° C. for 4 hours to convert the glass to glass-ceramic. The glass-ceramic rods are immersed in a bath containing an equimolar mixture of lithium sulfate and sodium sulfate. The rods are immersed in this bath at 900° C. for 2 minutes, removed from the bath and heated further for about 10 minutes at 900° C. Then the rods are subjected to the blasts of air for thermal tempering that also includes the subsequent cooling of the main body of the rods, as described above in Example I.

After the lithium exchange for sodium by the salt treatment, there may be a slight amount of additional exchange due to the adherent coating of salt but this is of no consequence. The subsequent heat treatment at 900° C. converts at least part of the lithium content of the ion-exchanged surface layer to beta-eucryptite-like crystalline material. The main body of glass-ceramic has an expansion coefficient substantially above the minimum required in the present invention so that additional tensile stress of the desired pattern is created in the main body of the article.

In a modification of this example, the glass-ceramic rods are prepared using a heat treatment of 2 hours instead of 4 hours at 1020° C. In this case the crystallinity is less. The ion exchange can be performed to the same depth at a substantially lower temperature for the salt in the bath for the same time of treatment. With this shorter period of time at the finishing temperature there remains more sodium ions in the glassy matrix of the glass-ceramic obtained.

My copending patent application Ser. No. 558,238, on which the present application is based in part, describes part of the process of the present invention as set forth in this embodiment. It states that the heat treatment at a specific final temperature is for a period of time less than one-half of that which will produce the maximum amount of crystalline phase so that the glass matrix of the glass-ceramic will contain a substantial amount of soda. In this embodiment the glass-ceramic article is treated with a lithium-containing ion-exchange material, such as the molten mixture of salts including lithium sulfate mentioned above, at an elevated temperature for a period of time to replace sodium ions by lithium ions in the glass matrix in a surface layer of the glass-ceramic article. The subsequent additional crystallization is disclosed and indicated to be beta-eucryptite-like that has a lower expansion coefficient than nepheline which is the predominant crystalline phase of the glass-ceramic of the main body.

EXAMPLE IV

An article of glass containing, on a mole basis, 56.7% $SiO_2$, 8.6% $Na_2O$, 21.0% $Al_2O_3$, 13.7% CaO, 4.0% MgO and 8.6% $TiO_2$ is made from glass manufactured as described in British patent specification No. 869,328. The MgO and $TiO_2$ are on a mole percent basis in excess of the base glass composition. This glass article is converted to glass-ceramic by heat treatment for 3 hours at 830° C. and then for 6 hours at 1080° C. This heat treatment is the same as that used in Example 61 of that patent, except that the treatment at 1080° C. is only one-half of the 12 hours used in that example of the patent.

According to the patent this glass has an expansion coefficient (0°C.–300° C.) of $62 \times 10^{-7}$/° C. while the glass ceramic has a coefficient of $67 \times 10^{-7}$/° C. when the 1080° C. treatment is for 12 hours. Thus the glass-ceramic article of the present example has an intermediate expansion coefficient.

This article of glass-ceramic is ion exchanged at 1040° F., using the molten eutectic mixture of salt used in Example I, cooled, washed and dried as in that example. Thereafter the article is heated at 1600° F. for the additional crystallization and is thermally tempered from this temperature, as in Example I.

EXAMPLE V

A molten glass was made with batch materials to provide the following composition.

Ingredients: | Wt. percent
--- | ---
$SiO_2$ | 47.2
$Al_2O_3$ | 31.1
MgO | 10.5
$Na_2O$ | 1.5
$ZrO_2$ | 8.0
$TiO_2$ | 1.5
$SnO_2$ | 0.2

This glass was made in a pot in a conventional manner that is well known in the art. This glass had a liquidus of greater than 2760° F. Glass cane was drawn from the molten glass. The silica, alumina and magnesia contents were within the broad and preferred ranges of glasses that are utilized in the process disclosed and claimed in U.S. Patent No. 3,117,881. This specific glass had an average coefficient of linear expansion (0–300° C.) of $$33.7 \times 10^{-7}/° C.$$

The glass cane was cut into sample rods. Most of the sample rods were heat treated as follows to convert them to a glass-ceramic. These rods were heated to and maintained at 1450° F. (788° C.) for 1½ hours, heated to and maintained at 1750° F. (954° C.) for 1½ hours, heated to and maintained at 2000° F. (1093° C.) for 1½ hours, and then cooled gradually to room temperature. By this treatment the glass of the rods was converted to a glass-ceramic. Cordierite crystals are the predominant crystals in the crystalline phase. This glass-ceramic had an average coefficient of linear expansion (0–300° C.) of $59.0 \times 10^{-7}$/° C. which is greater than that of the glass.

Sample rods of this glass-ceramic after preheating for one-quarter hour at 1450° F. while suspended in a tubular furnace were moved laterally by moving the tubular furnace directly above another furnace containing salt in a crucible liner in a metal container. The latter furnace was maintained at a temperature of 1450 or 1500° F., at which temperature salt was molten. The molten salt bath contained, on a weight basis, 75% lithium sulfate, 24% potassium sulfate and 1% sodium hydrogen sulfate. The rods were lowered for immersion in the molten salt for specific periods of time, raised from the bath, cooled gradually in air, water washed and then dried.

Most of the ion-exchanged treated sample rods of glass-ceramic were abraded, as described below. Some were tested for flexural strength without any abrasion. Sample rods of glass-ceramic that had not been subjected to the molten salt bath immersion were also tested for flexural strength, some without abrasion and some with abrasion. The results are tabulated below:

| Temperature of salt bath, °F. | Time of immersion, hrs. | Flexure strength, p.s.i. Unabraded | Flexure strength, p.s.i. Abraded |
| --- | --- | --- | --- |
| ----- | 0 | 22,000 | 14,000 |
| 1,450 | 1.5 | 34,300 | 27,000 |
| 1,450 | 4.0 | ------ | 31,000 |
| 1,500 | 1.5 | ------ | 27,200 |

The temperature of the molten salt treatment was sufficiently elevated to provide at least in that exterior part of the surface layer a presumed additional in situ crystallization of part of the glass matrix of the initial glass-ceramic changed in composition by replacement of sodium ions by lithium ions. The process provides in at least the exterior part of the surface layer by ion exchange, a reduction in the expansion coefficient. This can account for the improved flexural strength after the process of ion exchange under conditions that provide also in situ crystallization. This compressive stress surface layer also provides a retention during a specific abrasion of flexural strength greater than that of the unabraded initial glass-ceramic.

The foregoing appears as Example I of my copending patent application Ser. No. 558,238. In accordance with the present invention, the dried additionally-crystallized ion-exchanged glass-ceramic rods are heated to 1600° F. and then the surface layer of the rods is cooled by air blasts as described in Example I above followed by cooling of the main body of the rods as in that example. This results in thermal tempering of the rods and provides the desired stress pattern so that the rods shatter upon breakage as do thermally tempered glass.

In a modification of this example the rods, after the additional crystallization of the surface layer, provided by the ion-exchange treatment and the temperature of the rods during the ion exchange, are removed from the molten salt bath and maintained at 1500° F. to allow most of the molten salt to drain from the rods. Thereafter the rods are subjected to the air blasts and to the rest of the thermal tempering treatment described above. Of course, after the rods have cooled sufficiently towards room temperature or when they reach room temperature, any adhering salt is removed by water wash.

In another modification the heat treatment for the initial bulk crystallization is changed to provide for only 45 minutes at 2000° F. instead of 1½ hours to decrease the crystallinity.

The abrasion used on the ion-exchanged rods, prior to the flexural strength test to obtain abraded strength values in Example V, comprised manually rubbing the sample rods of glass-ceramic with No. 320 emery paper.

The foregoing examples illustrate the process of the present invention in which the initial crystallization provides a predominant crystalline phase containing as essential ingredients $SiO_2$, $Al_2O_3$, and either $Li_2O$, $Na_2O$ or MgO. In view of the foregoing disclosure including these examples, similar modifications, as in Example V, can be made in the glass compositions of Tables IV through XIV of U.S. Patent No. 2,920,971 for their use in the present process. Of course, most of these do not contain any alkali metal oxide or fluoride but such can be incorporated in these compositions as taught by the patent.

Reference has been made to flexural strength and values have been given. The flexural strengths or modulus of rupture values were determined using a Tinius-Olsen testing machine. This machine applies a measured load through a single knife edge to the center of the sample rod supported on two knife edges (3-point loading). The load is applied at a constant rate of 24 pounds per minute until failure occurs, with a marker indicating the highest load applied to the point of failure. A dial micrometer calibrated in inches and equipped with a bar contact instead of a point contact is used to measure the maximum and minimum diameters at the center of the sample to an accuracy of 0.0005 inch. Since few cane samples are perfectly round, the load is applied normal to the maximum diameter and the standard formula for an elliptical cross-section is used in calculating the modulus of rupture (MR) as follows:

$$MR = \frac{\text{Load (lbs.)} \times 8 \times \text{span (in.)}}{(D_1^2 \times D_2)\pi}$$

The modulus of rupture in this formula gives the flexural strength in pounds per square inch of cross sectional area at failure.

The foregoing description of the present invention has referred to various copending U.S. patent applications having common assignee. Their disclosures are hereby incorporated by reference.

The article of the present invention is better understood with reference to the various embodiments of the process, although the article is not restricted to the particular method of making it that is described above.

Various terms, including "strain point" and "annealing point" have been used in this description. The definitions of these terms are well-known in the art and in the published literature.

The article of the present invention has many forms of utilization such as bottles, tableware, flat glass, etc. In view of the fact that such articles can be made by the process of the invention in which the initial article is glass, obviously such article can take many different forms in which glass can be processed by using conventional forming, drawing or other shaping operations.

I claim:

1. A process of forming from an article of glass an article of glass-ceramic having the property, upon shattering, of providing a dicing effect similar to that of thermally tempered glass and having a surface layer with a high compressive stress which comprises:
   (1) heat treating an article of thermally crystallizable glass at elevated temperatures, including a nucleation temperature and a subsequent higher maximum temperature for periods of time at said temperatures and for a period of time for any temperature intermediate said nucleation temperature and said subsequent maximum temperature, sufficient to provide by bulk crystallization a glass-ceramic article having an average coefficient of linear thermal expansion of greater than $30 \times 10^{-7}/°$ C. for the range of 25° C. to 300° C. and a compressive stress surface layer of glass-ceramic of the same overall composition as that of the main body, said thermally crystallizable glass containing $SiO_2$, $Al_2O_3$, a metal oxide capable of forming with said $SiO_2$ and $Al_2O_3$ a crystalline phase of said glass-ceramic article, a nucleant, and an alkali metal oxide selected from the group consisting of $Na_2O$ and $K_2O$ in a concentration, on an $Na_2O$ mole equivalent basis, of at least 1% by weight of the composition, said $SiO_2$, $Al_2O_3$, metal oxide, nucleant, alkali metal oxide and any alkaline earth metal oxide selected from the group consisting of MgO and CaO, if present, constituting at least 90% by weight basis of the glass;
   (2) treating the article of glass-ceramic with an ion-exchange medium containing a salt of lithium at an elevated temperature above the temperature of the strain point of the thermally crystallizable glass and for a period of time to exchange ions of said lithium of the ion-exchange medium for ions of said alkali metal oxide in the surface layer only of the glass-ceramic article to produce an ion-exchanged glass-ceramic having a higher $Li_2O$ content in the surface layer than in the main body;
   (3) heating the ion-exchanged glass-ceramic article at an elevated temperature and for a period of time sufficient to convert by additional crystallization at least part of said increased $Li_2O$ content in said surface layer to crystallize material containing said $Li_2O$, $SiO_2$ and $Al_2O_3$; and
   (4) thermally tempering the additionally-crystallized glass-ceramic article from a temperature above the annealing point of the thermally crystallizable glass and below the softening point of the glass-ceramic to provide said article having said shattering property and said compressive stress surface layer.

2. The process of claim 1 wherein the thermal tempering of the additionally-crystallized ion-exchanged glass-ceramic is thermally tempered from a temperature between 1400° F. and about 2100° F.

3. The process of claim 2 wherein
   (1) the thermally crystallizable glass contains alkaline earth metal oxide selected from the group consisting of MgO and CaO,
   (2) said nucleant is selected from the group consisting of $TiO_2$ and $ZrO_2$,
   (3) said thermally crystallizable glass contains, on an approximate weight basis, 60% to 74% $SiO_2$, 13% to 17% $Al_2O_3$, 1.5% to 2% $Li_2O$, 6% to 13% said alkaline earth metal oxide, 2.5% to 6% said alkali metal oxide selected from the group consisting of $Na_2O$ and $K_2O$ and 2% to 8% said nucleant,
   (4) $TiO_2$ in said glass composition is a maximum of 7% by weight and $ZrO_2$ is present in said composition in a maximum of 2% by weight, and
   (5) the maximum temperature of the heat treating of the glass to form glass-ceramic is between 1500° F. and 2000° F.

4. The process of claim 3 wherein the thermally crystallizable glass, on an approximate weight basis, contains 2% to 7% MgO, 2% to 7% CaO, 1% to 7% $TiO_2$, 0% to 2% $ZrO_2$, 0% to 6% $Na_2O$ and 0% to 4% $K_2O$, and the sum of $Li_2O$ and $TiO_2$ is 3% to 9%, the sum of $TiO_2$ and $ZrO_2$ is 2% to 8% and the sum of $Na_2O$ and $K_2O$ is 2.5% to 6%.

5. The process of claim 4 wherein
   (1) the composition of the thermally crystallizable glass contains, on an approximate weight basis, 70.4% $SiO_2$, 15% $Al_2O_3$, 4% MgO, 3% CaO, 1.6% $Li_2O$, 2% $TiO_2$, 1% $ZrO_2$ and 3% $Na_2O$,
   (2) the maximum temperature of the bulk crystallization to convert the glass to glass-ceramic is about 1650° F.
   (3) the ion exchange uses an ion-exchange medium containing, on an approximate weight basis, 63% lithium sulfate, 23% sodium sulfate and 14% potassium sulfate,
   (4) the ion exchange is at 1050° F. for about 30 minutes,
   (5) the temperature of the additional crystallization is 1600° F. and the time of said additional crystallization is about 2 hours, and
   (6) the thermal tempering of the article is initiated at 1600° F. by rapidly cooling a surface layer of the article.

6. The process of claim 1 wherein
   (1) the composition of the thermally crystallizable glass contains, on an approximate weight basis, 47.2% $SiO_2$, 31.1% $Al_2O_3$, 10.5% MgO, 1.5% $Na_2O$, 8% $ZrO_2$, 1.5% $TiO_2$ and 0.2% $SnO_2$,
   (2) the bulk crystallization is for 1½ hours each at 1450° F., 1750° F. and 2000° F.,
   (3) ion exchanging the glass-ceramic by immersion in an ion-exchange medium containing, on an approximate weight basis, 75% lithium sulfate, 24% potassium sulfate and 1% sodium hydrogen sulfate,
(4) the ion exchange is at 1450° F. for a period of time from about 1½ hours to about 4 hours,
(5) the additional crystallization is provided during the ion exchange, and
(6) the thermal tempering of the article is initiated at 1600° F. by rapidly cooling a surface layer of the article.

References Cited

UNITED STATES PATENTS

| | | | |
|---|---|---|---|
| 2,920,971 | 1/1960 | Stookey | 65—30 XR |
| 3,282,770 | 11/1966 | Stookey et al. | 65—30 XR |
| 3,287,200 | 11/1966 | Hess et al. | 65—30 XR |
| 3,428,513 | 2/1969 | Denman | 65—33 XR |

S. LEON BASHORE, Primary Examiner

JOHN H. HARMAN, Assistant Examiner

U.S. Cl. X.R.

65—30; 106—52; 161—1